UNITED STATES PATENT OFFICE.

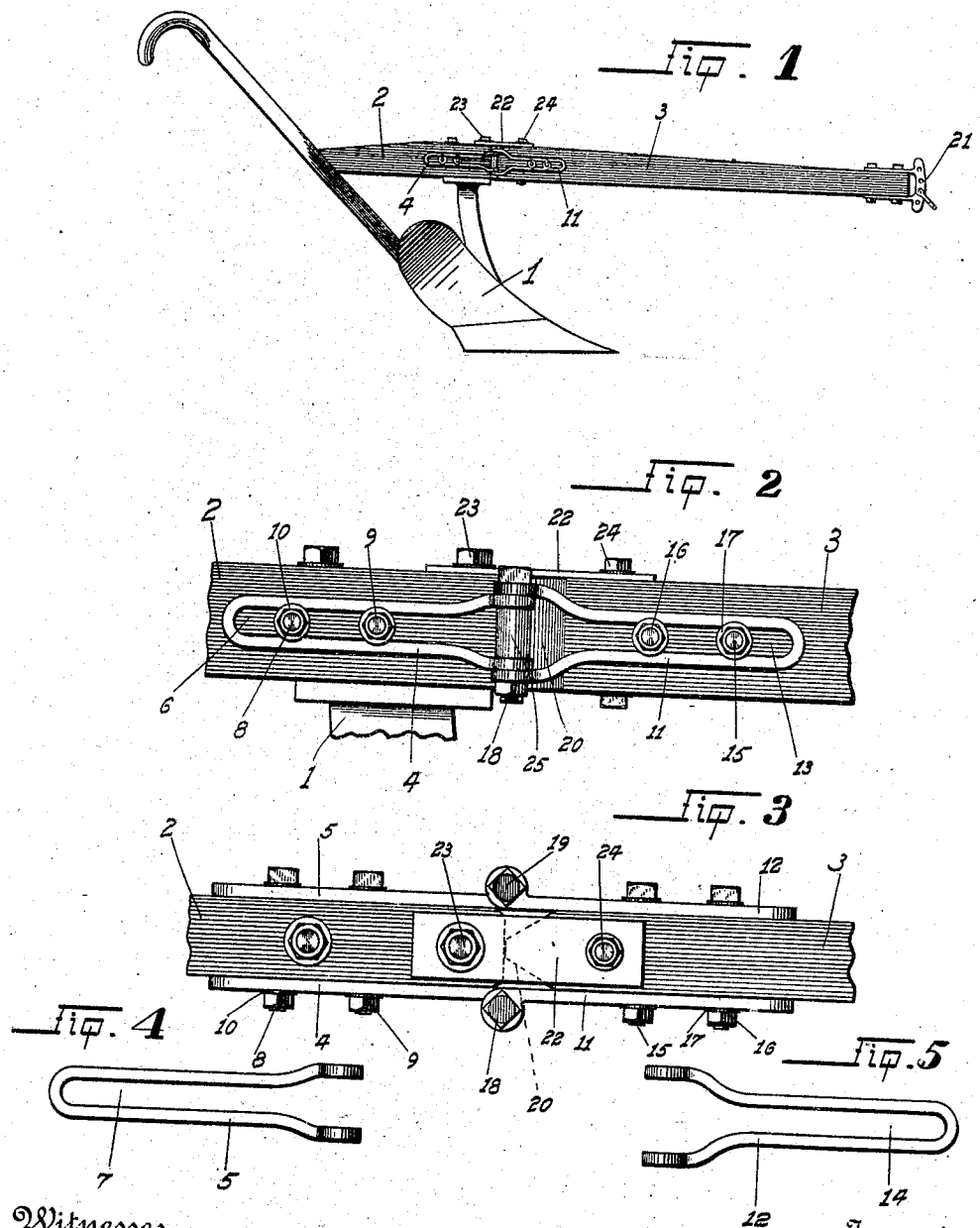

ASA L. VAN VALKENBURGH, OF ACAMPO, CALIFORNIA.

PLOW.

No. 894,921.      Specification of Letters Patent.      Patented Aug. 4, 1908.

Application filed November 4, 1907. Serial No. 400,436.

*To all whom it may concern:*

Be it known that I, ASA L. VAN VALKENBURGH, a citizen of the United States, residing at Acampo, in the county of San Joaquin and State of California, have invented certain new and useful Improvements in Plows; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in plows and particularly in vineyard plows, the object of the invention being to produce such a plow as will have a hinged draft beam, whereby when the plow is being used to plow vineyards or similar places, the horse may be driven in the middle of the row, while the plow may be turned in any direction so as to work under and around the vines without the danger of breaking or injuring them with the beam or swingletree. Also a simple, inexpensive and effective device for the purpose. This object I accomplish by means of a beam divided into two pieces, the same being suitably hinged together by double sliding hinges; also by such other and further construction and relative arrangement of parts as will appear by a perusal of the following specification and claims.

In the drawings similar characters of reference indicate corresponding parts in the several views.

Figure 1 is a side elevation of a plow showing the improvement installed thereon. Fig. 2 is a side elevation of the improved hinge mechanism. Fig. 3 is a top plan view of Fig. 2. Figs. 4 and 5 are side elevations of hinge members.

Referring more particularly to the characters of reference on the drawings 1 designates a plow having a two piece beam 2—3 suitably hinged in the following manner:—

4 and 5 are hinge members disposed on each side of the member 2 at the outer end thereof, said hinge members being formed with longitudinal slots 6 and 7 through which the securing bolts 8 extend, the said bolts being provided with nuts 9 and washers 10 bearing intermediate said bolts and said members 4 and 5.

11 and 12 are hinge members secured on each side of the member 3 at the inner end thereof, said hinge members being provided with longitudinal slots 13 and 14 through which the retaining bolts 15 extend, the said bolts being provided with nuts 16 and washers 17 disposed intermediate said nuts and said hinge members.

The hinge members 4 and 11 and 5 and 12 are suitably pivoted together by means of the usual pintles 18 and 19.

The inner end of the member 3 is beveled at 20 to permit said member to turn as will appear. At the outer end of the member 3 is secured the usual clevis 21.

22 is a top plate disposed across from the top of the member 2 to the top of the member 3 and provided with suitable bolts 23 and 24.

In using the device the motive power is connected with the clevis 21 and directed in any direction desired, while the plow is permitted to be turned in any desired manner by reason of the hinge connections, the said hinge members sliding over their respective retaining bolts by means of their respective slots, which construction permits the operation of the double hinges together.

The top plate 22 adds strength to the hinges and prevents them from buckling up.

The beveled portion 20 permits the member 3 to abut directly against the member 2 and still be capable of turning.

Thus it will be seen that I have produced such a device as fulfils all the objects of the invention as set forth herein.

While this specification sets forth in detail the present and preferred embodiment of my invention still many deviations therefrom may be resorted to, within the scope of my claims, without departing from the spirit of my invention.

Having thus described my invention what I claim as new and useful and desire to secure by Letters Patent is:—

1. In a device of the character described a plow, a beam thereon composed of two members and a hinge slidably connected on each side of said members and hinging the same together, as set forth.

2. In a device of the character described, a plow, a beam thereon, said beam being formed of two members, a hinge member disposed on each side of each beam at the abutting ends thereof, said hinge members being provided with longitudinal slots, bolts disposed through said beam members and said slots, nuts on said bolts, and washers interposed intermediate said nuts and said hinge members, and means pivoting those hinge members on one beam member to those on the other, as set forth.

In testimony whereof I affix my signature in presence of two witnesses.

ASA L. VAN VALKENBURGH.

Witnesses:
JOSHUA B. WEBSTER,
STEPHEN BLEWETT